United States Patent
Sakai et al.

(10) Patent No.: US 7,499,205 B2
(45) Date of Patent: *Mar. 3, 2009

(54) OPTICAL MEMBER HOLDING DEVICE, AND OPTICAL SCANNING DEVICE PROVIDED WITH THE SAME

(75) Inventors: Toshio Sakai, Nagoya (JP); Yasuo Tamaru, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 6 days.

This patent is subject to a terminal disclaimer.

(21) Appl. No.: 11/429,949

(22) Filed: May 9, 2006

(65) Prior Publication Data

US 2006/0203079 A1 Sep. 14, 2006

Related U.S. Application Data

(62) Division of application No. 10/702,598, filed on Nov. 7, 2003, now Pat. No. 7,349,166.

(30) Foreign Application Priority Data

Nov. 8, 2002 (JP) ............................. 2002-325939

(51) Int. Cl.
G02B 26/08 (2006.01)
(52) U.S. Cl. ...................................... 359/216; 347/261
(58) Field of Classification Search ................. None
See application file for complete search history.

(56) References Cited

U.S. PATENT DOCUMENTS 4,803,361 A 2/1989 Aiki et al.
5,255,115 A * 10/1993 Kikuchi ...................... 359/209
5,444,520 A 8/1995 Murano
5,506,629 A 4/1996 Kawahara et al.
5,715,490 A 2/1998 Ishito
5,870,133 A 2/1999 Naiki
2004/0085654 A1 5/2004 Okazaki

FOREIGN PATENT DOCUMENTS

| CN | 1372411 A | 10/2002 |
|---|---|---|
| EP | 0 217 325 A2 | 4/1987 |
| JP | 51-012244 | 1/1976 |
| JP | A 62-205305 | 9/1987 |
| JP | A 64-000907 | 1/1989 |
| JP | A-10-282444 | 10/1998 |
| JP | B2-2910652 | 4/1999 |
| JP | A 2000-162483 | 6/2000 |
| JP | A-2000-284203 | 10/2000 |

* cited by examiner

Primary Examiner—James Phan
(74) Attorney, Agent, or Firm—Oliff & Berridge, PLC

(57) ABSTRACT

A device for holding a laser diode (LD) and a collimate lens. A laser unit includes an LD supporting section supporting the LD, and a lens supporting section supporting the lens positioned opposite to the LD. A connecting portion connects the lens supporting section to the LD supporting section. An adjustment section for adjusting a relative position between the LD and the lens is provided in association with the LD supporting section. The adjustment section allows the LD supporting section to be movable and position-fixable with respect to the lens supporting section as if the LD supporting section serves as a leverage about the connecting portion functioning as a fulcrum.

56 Claims, 8 Drawing Sheets

OPTICAL MEMBER HOLDING DEVICE, AND OPTICAL SCANNING DEVICE PROVIDED WITH THE SAME

This is a Division of application Ser. No. 10/702,598 filed Nov. 7, 2003. The entire disclosure of the prior application is hereby incorporated by reference herein in its entirety.

BACKGROUND OF THE INVENTION

The present invention relates to an optical member holding device capable of adjusting relative position of a first optical member and a second optical member, and to an optical scanning device provided with the holding device, and an image forming device provided with the scanning device.

A conventional electrophotographic image forming device such as a laser printer and a copier provides an image forming section where a photosensitive body is charged, and the surface of the photosensitive body is exposed to a laser beam irradiated from an optical scanning device to form an electrostatic latent image. The image is then visualized by a developer such as toner and the toner image is transferred onto a recording medium such as paper. A fixing device is provided for heating the toner image and fixing the image to the recording medium. In the optical scanning device, a laser beam is generated from a point source such as a laser diode (hereafter referred to as an "LD") and is collimated to parallel light by a collimator lens. A slit regulates a spread of the light flux. The light flux is converged by a cylindrical lens to refract only one direction and is focused on a rotating polygon mirror. Reflected on the polygon mirror, the light flux is scanned unidirectionally, passes various lenses and mirrors, and is irradiated to the photosensitive body from the optical scanning device. Such optical scanning device must highly accurately align the start point of the light flux, i.e., the relative position between the LD and the collimator lens must be accurately provided, otherwise the degree of defocus increases on the subsequent optical paths.

Japanese Patent Application Laid-Open Publication No. 2000-284203 discloses a lens holder (lens cell) supporting the collimator lens and an LD holder supporting the LD. The lens holder and the LD holder are fixed to a supporting member (supporting section). The lens holder can be displaced with respect to the supporting member in the optical axis direction of the laser beam for focus adjustment. The LD holder can be displaced in a direction parallel to a face opposite to the supporting member for the purpose of focus adjustment toward a plane direction orthogonal to the optical axis direction of the laser beam. During the position adjustment, the lens holder is temporarily fixed to the supporting member by means of a retaining spring and is then finally fixed with an adhesive. The position of the LD holder is fixed by a screw after the position adjustment of the LD holder.

However, the LD holder and the supporting member contact with each other on their surfaces. The contact surfaces are distortingly fixed to each other due to the fixing with the screw. A distortion occurs between the contact surfaces in the direction of rotation of the screw. This distortion causes misalignment between the LD and the collimator lens, deforming an image to be formed.

SUMMARY OF THE INVENTION

The present invention has been made in order to solve the above-mentioned problem, and it is an object of the present invention to provide an optical member holding device capable of aligning a first optical member and a second optical member without any contact therebetween, and to provide an optical scanning device provided with the holding device, and to provide an image forming device provided with the optical scanning device.

These and other objects of the present invention will be attained by a device for holding optical members including a first supporting section supporting a first optical member, a second supporting section supporting a second optical member positioned opposite to the first optical member, a connecting portion connecting the first supporting section to the second supporting section and an adjustment section for adjusting a relative position between the first optical member and the second optical member. The adjustment section allows the second supporting section to be movable and position fixable with respect to the first supporting section as if the second supporting section serves as a leverage about the connecting portion functioning as a fulcrum.

In another aspect of the invention, there is provided a device for holding optical members including a light source emitting a light flux and providing an optical axis, and a lens unit converging the light flux from the light source, the device including a first supporting section having a first supporting wall and a second supporting wall disposed substantially parallel to each other and extending along the optical axis. One of the light source and the lens unit is position-adjustably fixed between the first supporting wall and the second supporting wall.

In still another aspect of the invention, there is provided a device for holding optical members including the first support section, the second supporting section, the connecting portion, the adjustment section. The first optical member includes one of a light source emitting a light flux and defining an optical axis, and a lens unit converging the light flux. The second optical member includes a remaining one of the light source and the lens unit. The adjustment section adjusts a distance between the light source and the lens unit along the optical axis. The first supporting section has a first supporting wall and a second supporting wall disposed substantially parallel to each other and extend along the optical axis. The first supporting wall has one end portion connected to the connecting portion. The second supporting wall is provided with an opposing section positioned in confrontation with the second supporting section with a space therebetween. The adjustment section adjustably and angularly moves the second supporting section about the connecting portion toward and away from the opposing section for controlling the distance between the light source and the lens unit along the optical axis.

In still another aspect of the invention, there is provided an optical scanning device including a frame, the optical member holding device disposed in the frame, a rotatable polygonal mirror, a drive unit and an image focusing unit. The polygonal mirror is disposed in the frame and changes reflecting direction of the light flux emitted from the optical member holding device for scanning. The drive unit is disposed in the frame and rotates the polygonal mirror. The image focusing unit is disposed in the frame for focusing the scanned light flux onto an imaging medium.

In still another aspect of the invention, there is provided an image forming device including the optical scanning device, the rotatable polygonal mirror, the drive unit, the image focusing unit, a developing unit, a transfer unit and a fixing unit. The image focusing unit provides an electrostatic latent image on the imaging medium. The developing unit forms a visible developed image corresponding to the electrostatic latent image on the imaging medium. The transfer unit transfers the visible developed image from the imaging medium to an image recording medium. The fixing unit fixes the visible developed image on the image recording medium.

DETAILED DESCRIPTION OF THE PREFERRED EMBODIMENTS

A laser printer 1 according to one embodiment of the present invention will be described with reference to the accompanying drawings. First, overall structure of the laser printer 1 will be described with reference to FIG. 1.

Figure 1:
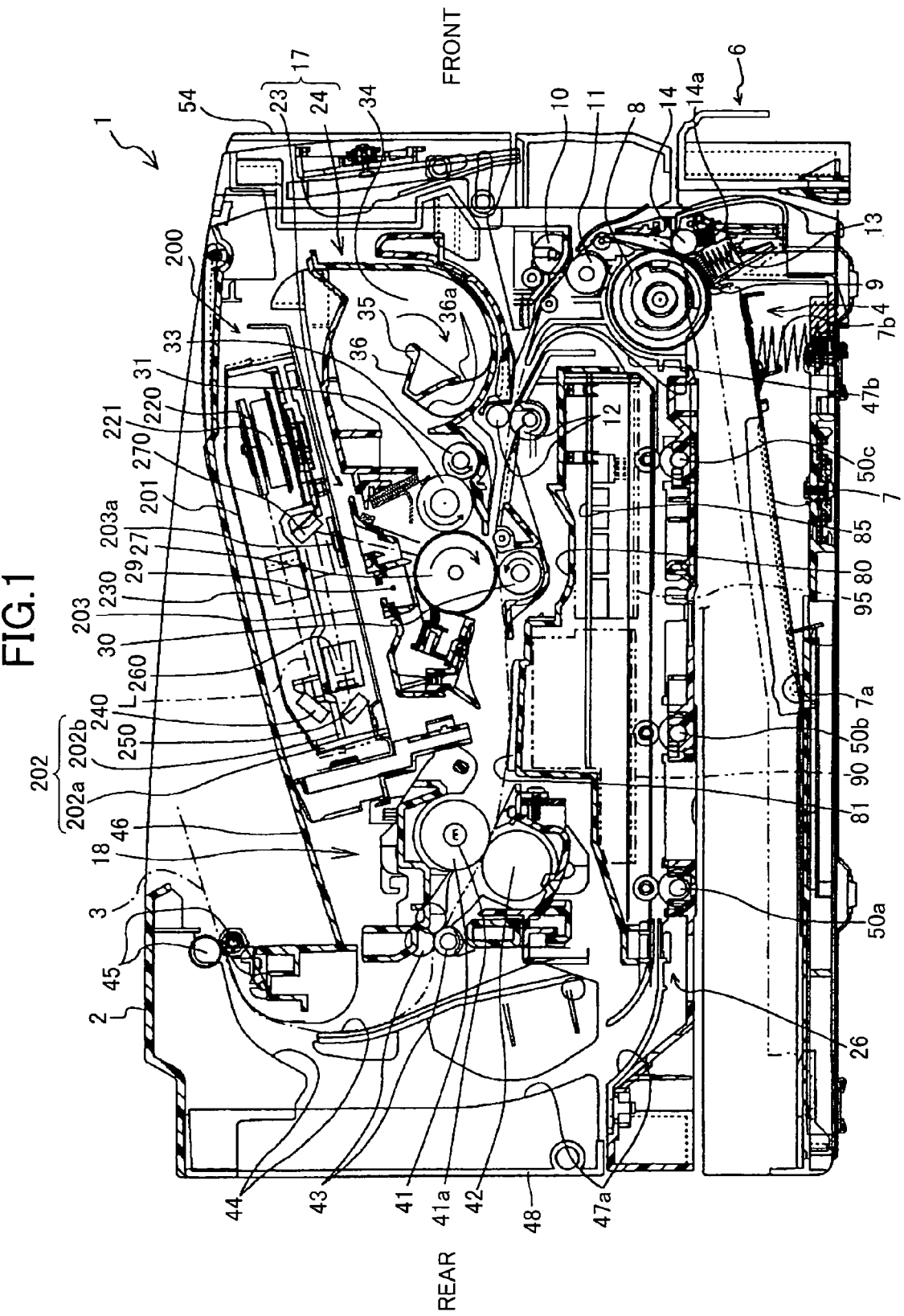
FIG. 1 is a cross-sectional view of a laser printer according to one embodiment of the present invention.

As shown in FIG. 1, the laser printer 1 includes a feeder section 4, and an image forming section, all accommodated in a main body case 2. The feeder section 4 is adapted for feeding sheets 3. The image forming section is adapted for forming an image on each fed sheet 3, and includes a scanner unit 200, a process cartridge 17, and a fixing unit 18. Note that the right side of FIG. 1 is the front side of the laser printer 1.

A sheet discharge tray 46 is formed at an upper central and relatively frontward portion of the main body 2 in a form of a recess. A bottom of the sheet discharge tray 46 is inclined upwardly toward the front side of the main body 2 and is bent so that the inclination is reduced toward the front side of the main body 2. The printed sheets 3 can be discharged onto the bottom of the sheet discharge tray 46 in a stacked manner. A space that holds a process cartridge 17 is provided in a portion close to the front upper surface of the main body case 2. The space is open to the front side so that the process cartridge 17 can be inserted thereinto. A cover 54 that pivots downward is provided on a right end side (front side) of the main body case 2 for covering the space. A process cartridge 17 is inserted and removed where the cover 54 is opened widely.

A sheet discharge path 44 is provided at the rear part in the main body case 2 (left side in FIG. 1). The sheet discharge path 44 is formed in a semi-circular shape that extends vertically along the back of the main body case 2. The sheet discharge path 44 delivers the sheet 3 from the fixing device 18 which is provided on a rear end side in a lower part of the main body case 2 to the sheet discharge tray 46, which is provided on an upper part of the main body case 2. A sheet discharge roller 45 for discharging the sheet 3 onto the tray 46 is provided along the sheet discharge path 44.

The feeder section 4 will be described in detail. The feeder section 4 includes a sheet supply tray 6, a sheet supply roller 8, a sheet pressing plate 7, a separation pad 9, a paper dust removing rollers 10, 14, a conveying roller 11, and registration rollers 12. The sheet supply tray 6 is mounted on the main body case 2 and detachable from the front side thereof. The sheet supply tray 6 is pulled forward to remove the sheet supply tray 6 from the main body case 2 and pushed rearward to mount onto the main body case 2. The sheet supply roller 8 is positioned at a bottom portion of the main body case 2 for supplying each one of the sheets 3. The sheet pressing plate 7 is disposed in the sheet supply tray 6. The sheet pressing plate 7 is adapted for holding a stack of sheets 3 and is biased toward the sheet supply roller 8.

The sheet pressing plate 7 has a remote end away from the sheet supply roller 8 and a proximity end close to the sheet supply roller 8. The remote end is pivotally connected to a bottom section of the sheet supply tray 6 so that the proximity end is movable toward and away from the sheet supply roller 8. A coil spring 7b is interposed between the bottom of the sheet supply tray 6 and a bottom surface of the sheet pressing plate 7 for normally urging the proximity end toward the sheet supply roller 8. With this arrangement, the sheet pressing plate 7 is pivotally moved downward in accordance with an increase in sheet stacking amount against the biasing force of the coil spring 7b.

The separation pad 9 is positioned at an upper end portion of the sheet supply tray 6 and in confrontation with the sheet supply roller 8. The separation pad 9 is biased toward the sheet supply roller 8 by a coil spring 13 for separating a sheet from remaining sheets of the sheet stack in cooperation with the sheet supply roller 8.

The paper dust removing roller 14 is positioned downstream of the separation pad 9 and in nipping relation with the sheet supply roller 8. Further, a sponge 14a is disposed in contact with the paper dust removing roller 14 at a position opposite to the sheet supply roller 8 with respect to the paper dust removing roller 14. Thus, paper dust generated due to the frictional contact of the sheet 3 with the separation pad 9 is electrostatically absorbed into the paper dust removing roller 14, and then trapped or wiped off by the sponge 14a.

The conveying roller 11 is disposed downstream of the sheet supply roller 8 in the sheet feeding direction for feeding the sheet picked up by the sheet supply roller 8. The paper dust removing roller 10 is disposed in nipping relation to the conveying roller 11 for removing paper dust from the sheet 3, and for transferring the sheet 3 in cooperation with the conveying roller 11. Paper dust which have not been removed by the paper dust removing roller 14 can be removed by the paper dust removing roller 10, thereby preventing paper dust from entering the image forming section. The register rollers 12 are positioned downstream of the conveying roller 11 in the sheet feeding direction for regulating sheet feeding timing to the image forming section.

Next, a double side printing unit 26 will be described. The double side printing unit 26 is disposed above the paper supply cassette 6 and includes reverse conveying rollers 50a, 50b, and 50c arranged in a substantially horizontal orientation. A reverse conveying path 47a is provided on the rear side of the reverse conveying roller 50a and a reverse conveying path 47b is provided on the front side of the reverse conveying roller 50c. The reverse conveying path 47a is formed in the inside of a backward cover 48, and extends from a pair of discharge rollers 45 to the reverse conveying rollers 50a and branches from an upstream end of a discharge path 44. The reverse conveying path 47b, on the other hand, extends from the reverse conveying roller 50c to the register rollers 12.

When performing double side printing, first an image is formed on one side of the sheet 3. Then a leading end portion of the sheet 3 is discharged onto the discharge tray 46. When the trailing edge of the sheet 3 becomes interposed between the discharge rollers 45, the discharge rollers 45 stop rotating forward and begin rotating in reverse. At this time, the trailing edge of the sheet 3 contacts the arched surface of the discharge path 44 and is guided along the arched surface to the reverse conveying path 47a, without returning to the fixing unit 18. The sheet 3 is conveyed from the reverse conveying path 47a to the reverse conveying rollers 50a, 50b, and 50c and is subsequently guided to the register rollers 12 along the reverse conveying path 47b. According to this operation, the sheet 3 is conveyed to the image forming unit with its front and back surfaces switched in order to form an image on the other side of the sheet 3.

A low-voltage power source circuit board 90, a high-voltage power source circuit board 95, and an engine circuit board 85 are provided between the double side printing unit 26 and the image forming unit. A chute 80 is disposed between these circuit boards 90, 95, and 85 and the image forming unit for separating these circuit boards 90, 95, 98 from the fixing unit 18, the processing cartridge 17, and other devices. A guiding plate 81 is provided on the top of the chute 80 for guiding the sheet 3. The guiding plate 81 forms a portion of the conveying path for the sheet 3. The chute 80 is bridged between lateral frames. Various components of the laser printer 1 are supportedly held between the lateral frames.

The low-voltage power source circuit board 90 functions to drop the voltage supplied from a source external to the laser printer 1, such as a single-phase 100V source, to a voltage of 24V, for example, to be supplied to components in the laser printer 1. The high-voltage power source circuit board 95 generates a high-voltage bias that is applied to components in the processing cartridge 17. The engine circuit board 85 drives a DC motor (not shown) and a solenoid (not shown). The DC motor is the source for driving parts involved in mechanical operations, such as the rollers in the laser printer 1. The solenoid (not shown) is adapted for switching the operating direction of this drive system.

The process cartridge 17 includes a drum cartridge 23 and a developing cartridge 24 that is detachably mounted on the drum cartridge 23. The drum cartridge 23 includes a photosensitive drum 27, a scorotron charger 29, and a transfer roller 30. The developing cartridge 24 includes a developing roller 31, a toner supply roller 33, and a toner hopper 34.

The photosensitive drum 27 is arranged in the drum cartridge 23 so as to contact the developing roller 31. The photosensitive drum 27 is rotatable clockwise as indicated by an arrow in FIG. 1. The photosensitive drum 27 includes a conductive base and a positively charging organic photosensitive body coated on the conductive base. The positively charging organic photosensitive body is made from a charge transfer layer dispersed with a charge generation material. When the photosensitive drum 27 is exposed to a laser beam, the charge generation material absorbs the light and generates a charge. The charge is transferred onto the surface of the photosensitive drum 27 and the conductive base through the charge transfer layer and counteracts the surface potential charged by the scorotron charger 29. As a result, a potential difference is generated between regions of the photosensitive drum 27 that were exposed to laser beam and regions that were not exposed to the laser beam. By selectively exposing and scanning the surface of the photosensitive drum 27 with a laser beam based upon image data, an electrostatic latent image is formed on the photosensitive drum 27.

The Scorotron charger 29 is disposed above the photosensitive drum 27. The Scorotron charger 29 is separated from and out of contact from the photosensitive drum 27 by a predetermined distance. The Scorotron charger 29 generates a corona discharge from a wire made from tungsten, for example, and is turned ON by a charging bias circuit unit (not shown) of the high-voltage power source 95 for charging the surface of the photosensitive drum 27 to a uniform charge of positive polarity.

The developing roller 31 is disposed downstream of the scorotron charger 29 with respect to the rotation direction of the photosensitive drum 27, and is rotatable in the counterclockwise as indicated by an arrow in FIG. 1. The developing roller 31 includes a roller shaft made from metal and a roller covered over the roller shaft. The roller is made from a conductive rubber material. A development bias is applied to the developing roller 31 from a development bias circuit unit (not shown) of the high-voltage power source 95.

The toner supply roller 33 is rotatably disposed beside the developing roller 31 on the opposite side from the photosensitive drum 27 across the developing roller 31. The toner supply roller 33 is in pressed contact with the developing roller 31. The toner supply roller 33 includes a roller shaft made of metal and a roller disposed over the roller shaft. The roller is made of a conductive foam material and is adapted to triboelectrify the toner to be supplied to the developing roller 31. To this effect, the toner supply roller 33 is rotatable counterclockwise as indicated by an arrow in FIG. 1. This is the same rotation direction as developing roller 31.

The toner hopper 34 is provided beside the toner supply roller 33. The inside of the toner hopper 34 is filled with developer to be supplied to the developing roller 31 by way of the toner supply roller 33. In this embodiment, non-magnetic, single-component toner with a positive charging nature is used as a developer. The toner is a polymeric toner obtained by copolymerizing polymeric monomers using a well-known polymerization method such as suspension polymerization. Examples of polymeric monomers include styrene monomers and acrylic monomers. Styrene is an example of a styrene monomer. Examples of acrylic monomers include acrylic acid, alkyl (C1 to C4) acrylate, and alkyl (C1 to C4) methacrylate. A coloring agent, such as carbon black, and wax are mixed in the polymeric toner. An external additive such as silica is also added in order to improve fluidity. Particle diameter of the external additive is approximately 6 to 10 μm.

An agitator 36 is provided for agitating toner accommodated in the toner hopper 34 and supplying the toner into a developing chamber 37. The agitator 36 has a coarse mesh-like plate shape extending in the axial direction (near-to-far direction in FIG. 1) and has a bend in the middle when viewed as a cross-section. A rotating shaft 35 is disposed on one end of the agitator 36. Film members 36a for scraping the inner wall of the toner hopper 34 are provided on the other end of the agitator 36 and on the bend in the middle of the agitator 36. The rotating shaft 35 is rotatably supported at the center of the toner hopper 34 in the longitudinal direction thereof and, hence, When the agitator 36 is rotated in the direction indicated by the arrow, toner accommodated in the toner hopper 34 is agitated and supplied to the toner supply roller 33.

A transfer roller 30 is disposed below the photosensitive drum 27 and downstream from the developing roller 31 with respect to the rotating direction of the photosensitive drum 27. The transfer roller 30 is rotatable counterclockwise as indicated by an arrow in FIG. 1. The transfer roller 30 includes a metal roller shaft coated with a roller made from an ion-conductive rubber material. During the transfer process, a transfer bias circuit unit (not shown) of the high-voltage power source 95 applies a transfer forward bias to the transfer roller 30. The transfer forward bias generates a potential difference between the surfaces of the photosensitive drum 27 and the transfer roller 30. The potential difference electrically attracts toner that has been electrostatically clinging to the surface of the photosensitive drum 27 toward the surface of the transfer roller 30.

It should be noted that the laser printer 1 employs what is known as a cleanerless developing system, in which the developing roller 31 recovers residual toner remaining on a surface of the photosensitive drum 27 after the transfer roller 30 transfers toner from the photosensitive drum 27 to the sheet 3.

The fixing device 18 in the image forming section is disposed downstream from the process cartridge 17 with respect to the direction of sheet transport. The fixing device 18 includes a heat roller 41, a pressure roller 42 for pressing the heat roller 41, and a pair of conveying rollers 43. The conveying rollers 43 are provided downstream from the heat roller 41 and the pressure roller 42. The heat roller 41 is formed by coating a hollow aluminum tube with a fluorocarbon resin and sintering the assembly. The heat roller 41 includes a halogen lamp 41a for heating inside the metal tube. The pressure roller 42 includes a silicon rubber shaft having low hardness, and tubular member covering the rubber shaft and formed of a fluorocarbon resin. The silicon rubber shaft is urged upward by a spring (not shown), pressing the pressure roller 42 against the heat roller 41. While the sheet 3 from the process cartridge 17 passes between the heat roller 41 and the pressure roller 42, the heat roller 41 pressurizes and heats toner image that was transferred onto the sheet 3 in the process cartridge 17, thereby fixing the toner onto the sheet 3. Afterward, the sheet 3 is transported to the sheet discharge path 44 by the conveying rollers 43.

Referring now to FIGS. 1 through 6, the following describes a scanner unit 200 as an optical scanning device and a laser unit 300 as an optical member holding device provided in the scanner unit 200.

As shown in FIG. 1, the body of the scanner unit 200 includes a scanner frame 202, a cover member 201 and a tray 203. The scanner frame 202 is made of resin mixed with reinforcement agent such as glass fiber and the like. The cover member 201 is adapted for covering an upper open end of the scanner frame 202, and is made of iron. The tray 203 is made of a steel plate that supports the bottom of the scanner frame 202 and is fixed between right and left body frames by screws. The scanner frame 202 represents the frame in the present invention.

Figure 2:
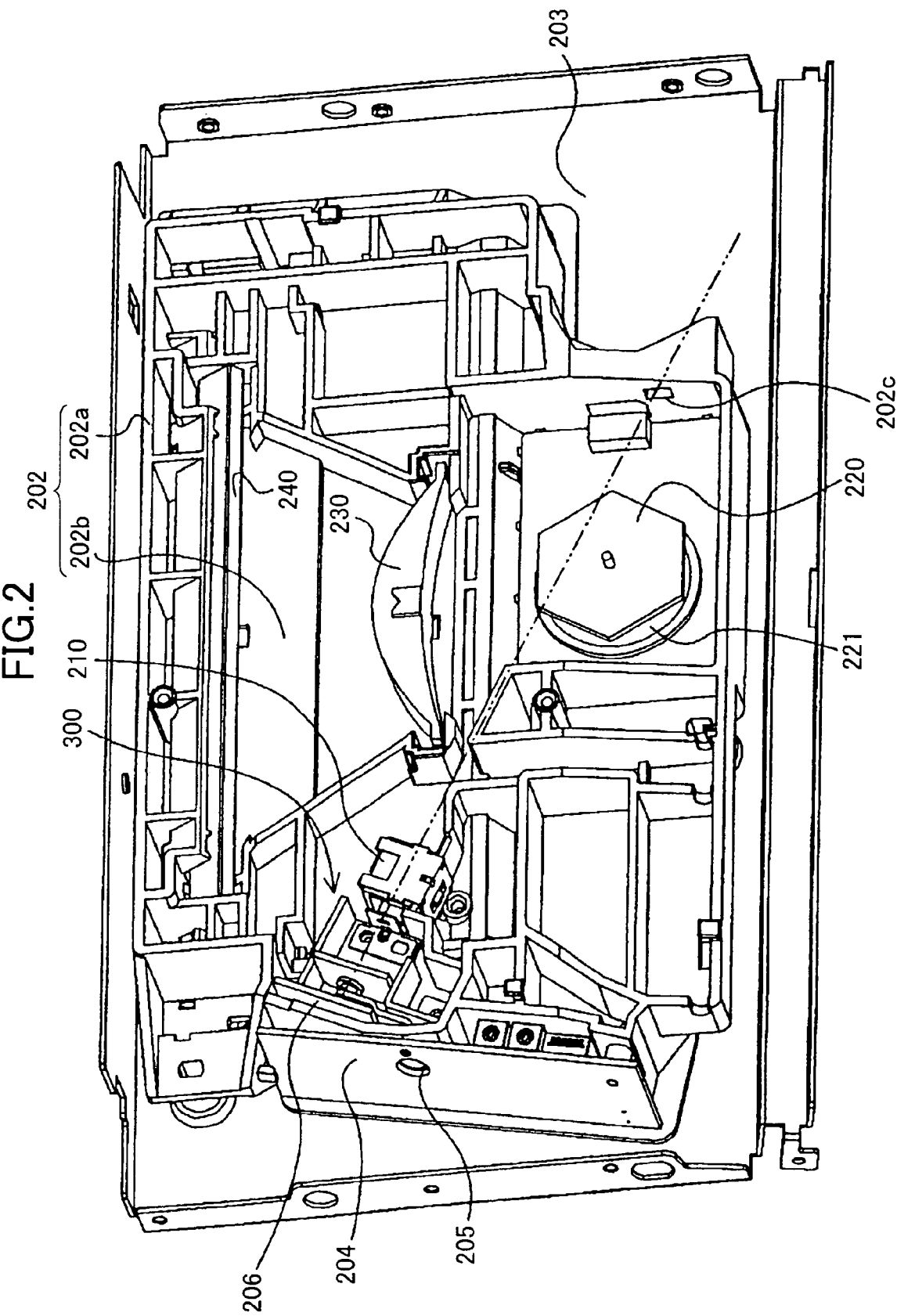
FIG. 2 is a perspective view of a scanner unit according to the embodiment and viewed from the top with a top cover member being removed.

As shown in FIG. 2, the tray 203 is in the form of a shallow box by bending four sides of a substantially rectangular plate in the same direction. An extending direction of short sides of the box-shaped tray 203 is directed in frontward rearward direction of the laser printer 1. Two holes for screwing are formed at both short side bent portions so that the tray 203 can be bridged and fixed between right and left body frames (not shown). That is, the major sides of the tray 203 extend in the transverse direction of the laser printer. An elongated opening 203a (see FIG. 1) extending in the major sides is formed at a substantial center of the tray 203. The scanner frame 202 includes an external wall 202a and a partition wall 202b. The external wall 202a surrounds a range slightly smaller than the bottom of the tray 203 in a substantially rectangular shape having a partial notch and is provided almost perpendicularly to the bottom of the tray 203. Inside the area surrounded by the external wall 202a, the partition wall 202b extends horizontally from a vertically middle portion of the external wall 202a for dividing a space defined by the external wall 202a into an upper space and a lower space.

A cylindrical lens 210 is provided at one longitudinal end of the scanner frame 202 and adjacent to the laser unit 300 in the upper space of the scanner frame 202 above the partition wall 202b. The cylindrical lens 210 vertically refracts a laser beam irradiated from the laser unit 300 and focuses the laser beam on a polygon mirror 220. The polygon mirror 220 and an fθ lens 230. At are positioned at one short side end of the scanner frame 202. The polygon mirror 220 is a rotating multifaceted mirror having six mirrors on a rotatable hexagonal body for horizontally scanning a laser beam focused on the mirror surface. When the laser beam is reflected on the polygon mirror 220 and is scanned at a constant angular velocity, the fθ lens 230 converts the laser beam into the beam of constant speed scanning. At the other end of the short side of the scanner frame 202, a mirror 240 is provided for reflecting and relaying the laser beam which has been passing through the fθ lens 230 toward the lower space of the scanner frame 202 below the partition wall 202b.

As shown in FIG. 1, the lower space of the scanner frame 202 accommodates therein a mirror 250, a cylindrical lens 260, and a mirror 270. The mirror 250 reflectingly directs the laser beam relayed by the mirror 240 to the inside of the scanner frame 202. The cylindrical lens 260 vertically refracts a flux of laser beams for correcting surface misalignment of the polygon mirror 220. The mirror 270 reflects the laser beam passing through the cylindrical lens 260 to let the laser beam out of the scanner unit 200 through the aperture 203a of the tray 203 and focus the laser beam on the surface of a photosensitive drum 27. The fθ lens 230, the mirrors 240, 250, and 270, and the cylindrical lens 260 are referred to as an imaging means in the present invention.

Figure 3:
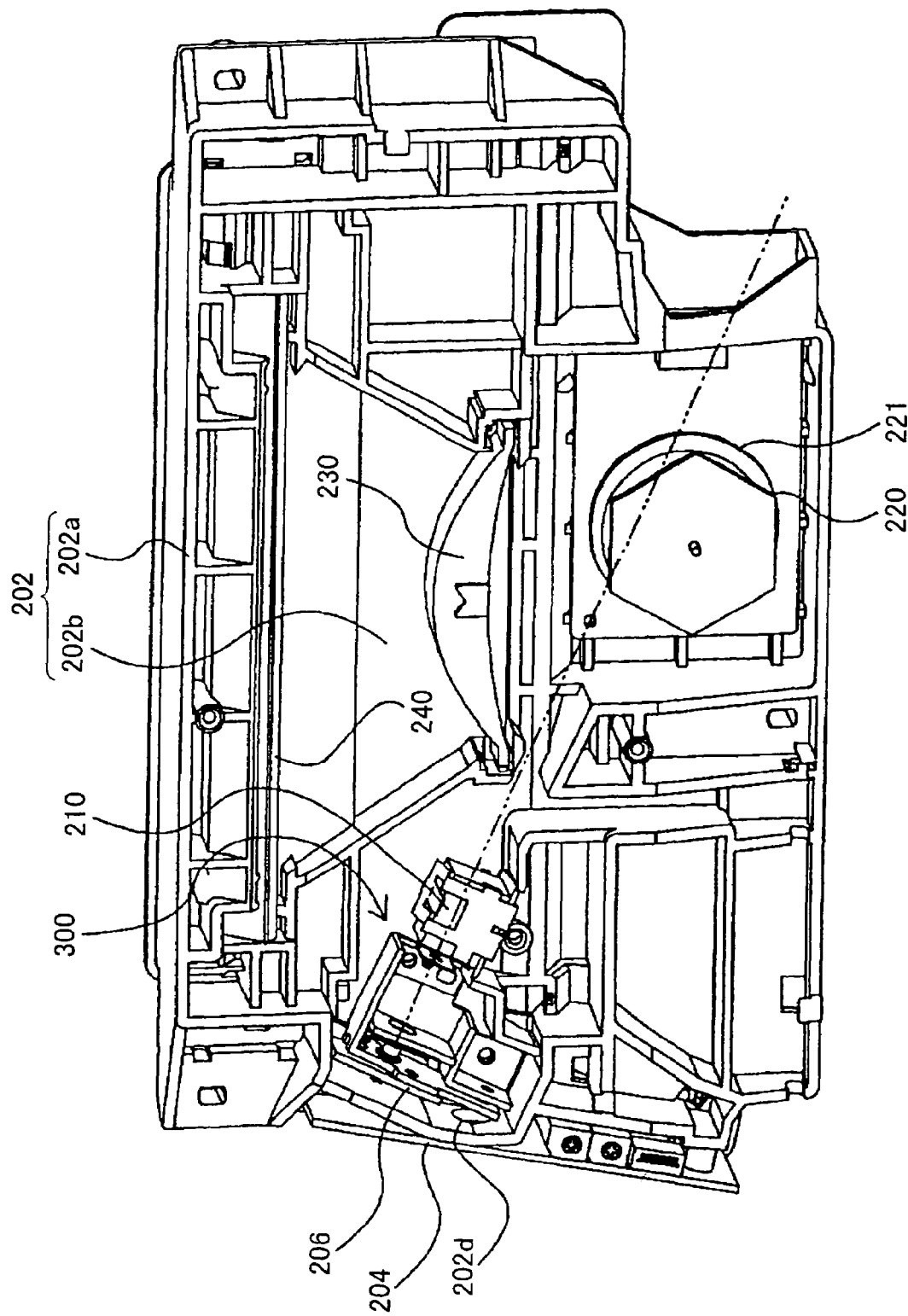
FIG. 3 is a perspective view of the scanner unit viewed from the top at an angle different from that in FIG. 2 with the top cover member being removed.

As shown in FIGS. 2 and 3, a motor 221 and a circuit substrate 204 are provided on an external wall surface of the scanner frame 202 assembled with the laser unit 300. The motor 221 serves as a drive means for rotationally driving the polygon mirror 220. The circuit substrate 204 is adapted for adjusting laser beam outputs from the laser unit 300. An adjusting hole 205 is formed in the circuit substrate 204, and a through-hole 202d coaxial with the adjusting hole 205 is formed in an external wall of the scanner frame 202. These holes allow a screwdriver or the like to be inserted therethrough for the optical axis adjustment of the laser unit 300 to be described later. An inspection hole 202c is formed in a wall of the scanner frame 202 at a position approximately coaxial with the optical axis (indicated by the chain double-dashed line in FIG. 2) for inspecting the optical axis of the laser beam to be irradiated to the polygon mirror 220 from the LD 350. A combination of the scanner frame 202, the laser unit 300, the polygon mirror 220, the fθ lens 230, the mirrors 240, 250, 270, the cylindrical lens 260, and the motor 221 constitutes the scanner unit 200 as the optical scanning device according to the present invention.

When the motor 221 rotatively drives the polygon mirror 220, a flow of air occurs in the scanner unit 200. The scanner unit 200 may inhale dust, toner powder, and the like into the inside thereof. The dust and the like adhere to the lens or the mirror surface to degrade the transmittance or the reflectance of the laser beam. This decreases the intensity of the laser beam to be irradiated onto the photosensitive drum 27, causing insufficient exposure. Such condition causes an adverse effect of, e.g., decreasing the amount of toner to be applied to paper 3 and thinning a printout result. To prevent this problem, the scanner unit 200 is almost hermetically sealed by filling an elastic member such as urethane foam into portions where the external wall 202a of the scanner frame 202 touches the top cover member 201 and the tray 203. The urethane foam also functions as a damper for moderating transmission of vibration generated by the rotation of the motor 221 to the tray 203.

The laser unit 300 for irradiating laser beams is provided at one longitudinal end of the scanner frame 202 in the upper space above the partition wall 202b of the scanner frame 202. A configuration of the laser unit 300 is shown in FIGS. 4 through 6 in which Z-axis direction corresponds to an optical axis direction of laser beam in the laser unit 300 and Y-axis direction and an X-axis direction respectively correspond to vertical and horizontal directions for mounting the laser unit 300 on the scanner frame 202.

Figure 4:
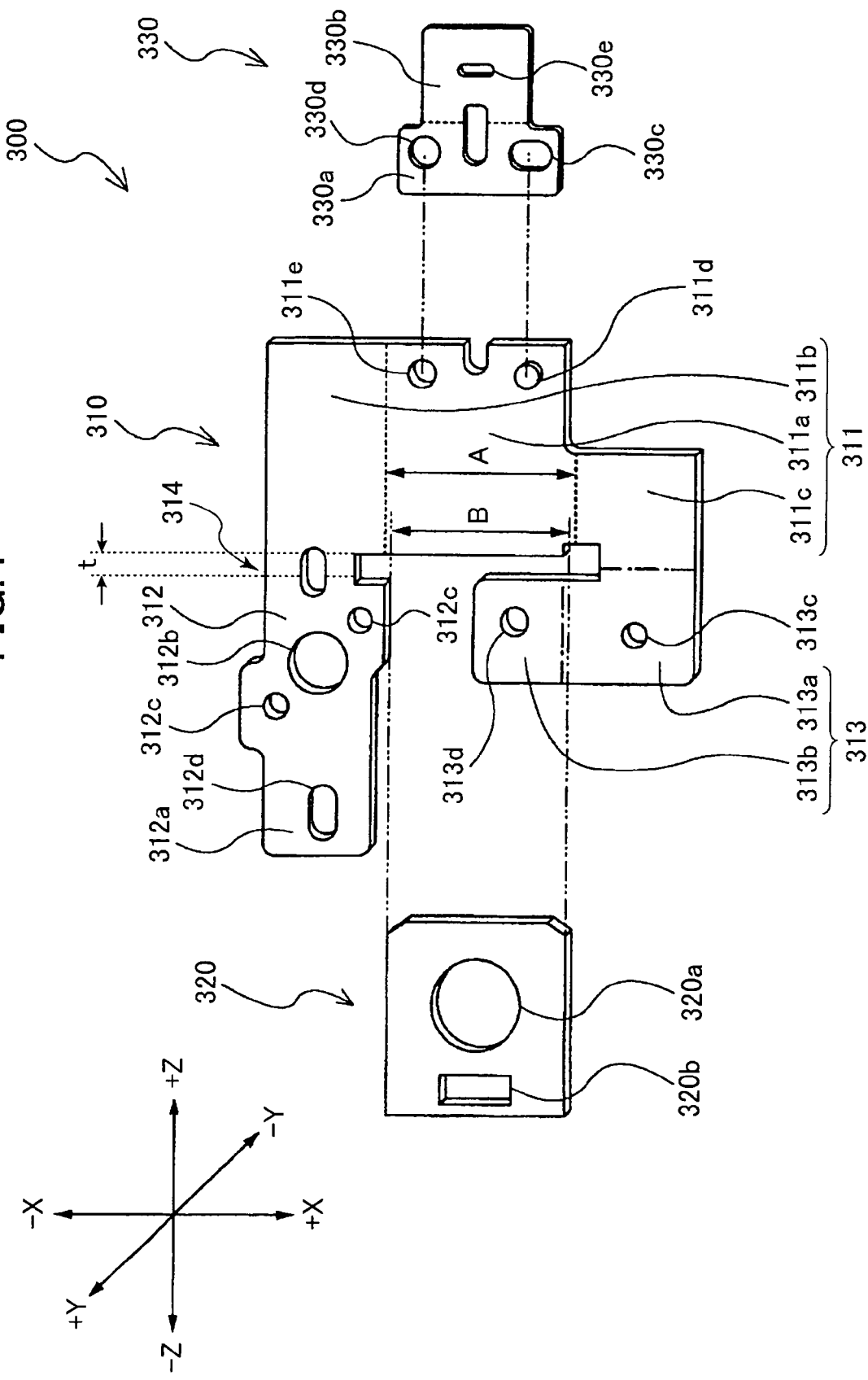
FIG. 4 is a fragmentary view showing components of a laser unit according to the embodiment.

FIG. 4 shows three segments to be bent and assembled to construct the laser unit 300. The laser unit 300 includes an LD supporting section 310, a lens holder 320, and a slit plate 330. The LD supporting section 310 functions as a second optical member and supports an LD 350 as a light source. The LD supporting section 310 is constructed by a single aluminum plate which will be bent into a given shape. The lens holder 320 is made of a substantially rectangular aluminum plate for supporting a collimator lens 360 almost at the center of the plate surface. A combination of the lens holder 320 and the collimator lens 360 functions as a first optical member. The slit plate 330 serves as a slit member provided with an elongated and narrow slit along a horizontal direction. A surface of the aluminum plate is preferably subjected to a light-brilliant treatment which enhances reflectivity of light taking the fixing the lens holder 320 into consideration. Since the LD supporting section 310 and the les holder 320 are made of metal, no humidity can be absorbed in these supporting segments. Accordingly, these supporting segments can stably maintain the positions of the light source and lens regardless of environmental changes.

The LD supporting section 310 includes a fixing section 311, a holding section 312, and an adjusting section 313. The fixing section 311 functions as a first supporting member for supporting the lens holder 320 and the slit plate 330. The holding section 312 functions as a second supporting member for holding the LD 350. The adjusting section 313 is adapted for adjusting a position of the LD 350 in the optical axis direction. The fixing section 311 includes a substantially rectangular bottom plate 311a and side plates 311b, 311c. As shown in FIG. 4, the side plate 311b is positioned at one longitudinal side of the bottom plate 311a and has a longitudinal length (in Z direction) substantially the same as the longitudinal length of the bottom plate 311a. Further, the side plate 311b has a length (in −X direction) shorter than the lateral length of the bottom plate 311a. The side plate 311c is positioned at another longitudinal side of the bottom plate 311a, and has a length (in +X direction) substantially the same as the length (in −X direction) of the side plate 311b. Further, one end of the side plate 311c (in +Z direction) is positioned at an intermediate position of the longitudinal side of the bottom plate 311a.

Figure 5:
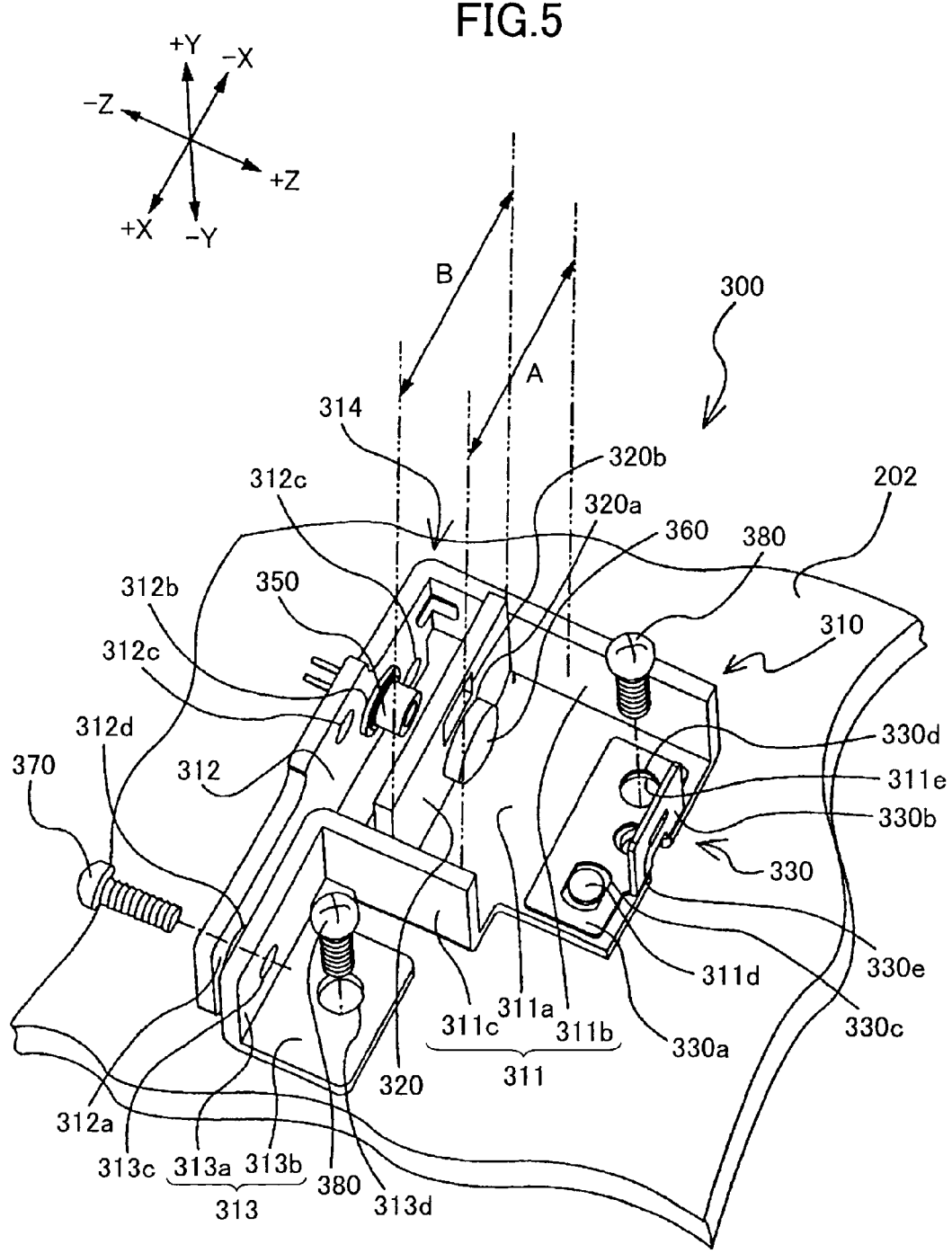
FIG. 5 is a perspective view showing the laser unit.
Figure 6:
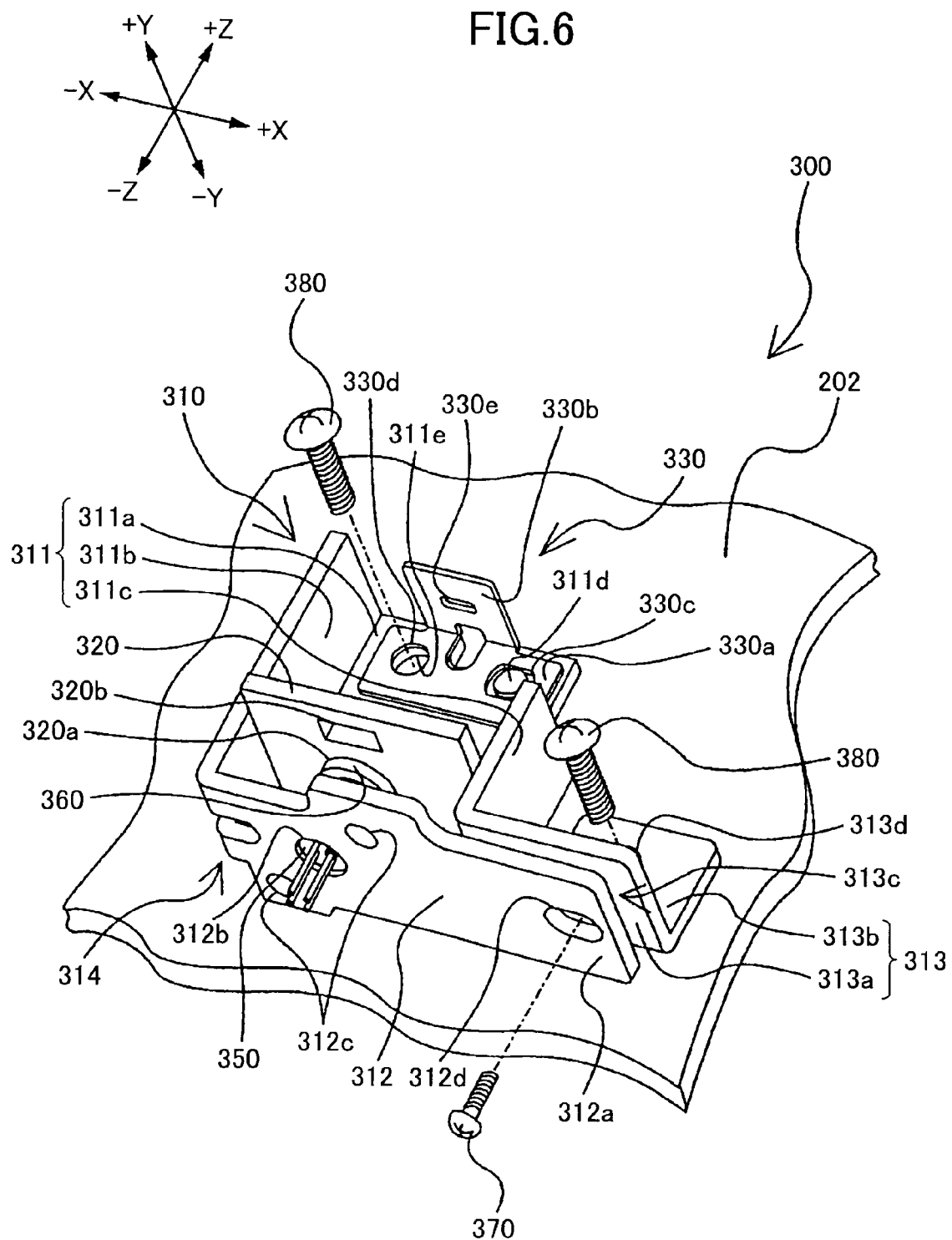
FIG. 6 is a perspective view showing the laser unit viewed at an angle different from that in FIG. 5.

As shown in FIGS. 5 and 6, the side plates 311b and 311c are bent in the same direction (+Y direction) almost orthogonal to the bottom plate 311a. At this time, the side plates 311b and 311c are disposed to face each other so that their surfaces are directed in parallel to each other. Turning back to FIG. 4, the bottom plate 311a has a +Z side provided with a positioning projection 311d for positioning the slit plate 330 and formed with a screw hole 311e for screwing the slit plate 330. The side plates 311b and 311c are referred to as supporting walls in the present invention.

As shown in FIG. 4, the holding section 312 extends from the end of the side plate 311b toward the −Z direction and is longer than the length of the short side of the bottom plate 311a. A connecting portion 314 connects the side plate 311b with the holding section 312 and is formed with a hole substantially at its center to divide the connecting portion 314 into two portions in the extending direction (−X direction) for decreasing a connection length. This aims at decreasing rigidity of the connecting portion 314 for facilitating bending at the connecting portion 314. When the side plate 311b is bent to the bottom plate 311a as shown in FIGS. 5 and 6, the holding section 312 is bent at the connecting portion 314 so that an extension end 312a of the holding section 312 is directed toward the side plate 311c. While the surface of the holding section 312 is substantially orthogonal to each surface of the plates constituting the fixing section 311, the holding section 312 is bent at a position displaced from the end of the side plate 311b toward the holding section 312 by a thickness t of the aluminum plate. This prevents the holding section 312 as the second supporting member from directly contacting the fixing section 311 as the first supporting member after bending degrees at the connecting portion 314. Accordingly, adjustment of the relative position between the light source as the second optical member and the lens unit as the first optical member can be performed without any distortion that may occur if the first and second supporting members are in contact with each other. The adjusted position can be maintained with no contact between the holding section 312 and the bottom plate 311a.

A supporting hole 312b is provided for force-fitting and supporting the LD 350 substantially at the center of the bent holding section 312 along the vertical direction (Y-axis direction) and substantially at the center of the bottom plate 311a with respect to the short side. Near the supporting hole 312b, there are provided two screw holes 312c for screwing an LD substrate 206 (see FIG. 2) that fixes terminals of the force-fitted LD 350. At the extension end 312a, there is provided an oblong adjusting hole 312d with its major axis extending along the longitudinal direction of the holding section 312. The LD substrate 206 is connected to the circuit substrate 204 (see FIG. 2) via a flat cable (not shown).

As shown in FIG. 4, the lens holder 320 is made by a substantially rectangular plate. The lens holder 320 is designed so that there is a difference of 100 µm or more between a width B along the short side of the lens holder 320 and an inside width A of the bent bottom plate 311a along the short side, i.e., the length between the side plates 311b and 311c (see FIG. 5) extending in parallel to each other. A supporting hole 320a is formed to support the collimator lens 360 at the center of the lens holder 320. The supporting hole 320a is provided so that the center of the collimator lens 360 is positioned in coincidence with the center of the lens holder 320 in the X-axis direction.

The lens holder 320 has one longitudinal end cut off at both corners thereof. Further, a holding hole 320b is formed near another longitudinal end of the lens holder 320. The holding hole 320b allows a holding tool to be engaged therewith for performing position adjustment of the lens holder 320. When the lens holder 320 is fixed to the fixing section 311 of the LD supporting section 310 as shown in FIGS. 5 and 6, the surface of the lens holder 320 is positioned at right angles to the surfaces of the bottom plate 311a and the side plates 311b and 311c. That is to say, the surface of the lens holder 320 is disposed substantially parallel to the surface of the holding section 312. At this time, the supporting hole 320a of the lens holder 320 substantially coaxial with the supporting hole 312b of the holding section 312 along the Z-axis direction.

The first supporting member 311 is only connected to the second supporting member 312 via the connecting portion 314 without direct contact at remaining regions. When relative position between the first optical member 360 and the second optical member 350 is adjusted, the adjusted position can be maintained without any distortion which may occur if the first and second supporting members provide a contacting region. Further, since a single component can be used to integrally configure the first supporting member 311 and the second supporting member 312, the number of parts can be decreased.

As shown in FIG. 4, the adjusting section 313 includes a side plate 313a and a bottom plate 313b. The side plate 313a extends from one end of the side plate 311c toward −Z direction by a substantially the same length as the side plate 311c. The side plate 313a functions as an opposing portion opposing to the second supporting member 312. The bottom plate 313b extends from one end of the side plate 313a toward −X direction by a substantially the same length as the side plate 313a. When the side plates 311b and 311c are bent to the bottom plate 311a as shown in FIGS. 5 and 6, the side plate 313a is bent away from the bottom plate 311a (+X direction) from the side plate 311c. As a result, the surface of the side plate 313a is positioned at right angles to the surfaces of the bottom plate 311a and the side plate 311c. The bottom plate 313b is bent from the side plate 313a so that the bottom plate 313b becomes parallel to the bottom plate 311a. The bottom plate 313b is provided with a screw hole 313d for fixing the bottom plate 313b to the scanner frame 202 by a screw 380. With this state, the side plate 313a faces the extension end 312a of the holding section 312. The side plate 313a is formed with a circular screw hole 313c in alignment with the approximate center of the adjusting hole 312d. When the holding section 312 is bent at the connecting portion 314, the extension end 312a of the holding section 312 faces the side plate 313a so that both surfaces do not contact each other by maintaining a distance therebetween within a length of a screw 370. The screw 370 is inserted from the adjusting hole 312d and engages with the screw hole 313c. Tightening or loosening the screw 370 functions as the position adjustment between the lens 360 and the LD 350. The adjusting section 313, the extension end 312a of the holding section 312, and the screw 370 are referred to as an adjustment means in the present invention. According to adjustment using this adjustment means, greatly moving the second supporting member 312 causes a working point to move slightly, enabling fine adjustment of the second optical member 350. The term working point is indicative of the position of the second optical member 350.

As shown in FIG. 4, the slit plate 330 includes a bottom plate 330a and a side plate 330b. The bottom plate 330a has a longitudinal side whose length is substantially the same as the length of the short side of the bottom plate 311a. The side plate 330b extends from one longitudinal side of the bottom plate 330a and a length of the longitudinal side of the bottom plate 330a is shorter than the length of the short side of the bottom plate 330a. The bottom plate 330a is formed with a positioning hole 330c and a screw hole 330d corresponding to the positioning projection 311d and the screw hole 311e of the bottom plate 311a, respectively. The side plate 330b has an elongated narrow slit hole 330e extending along the X-axis direction at substantially intermediate position with respect to a short side of the side plate 330b.

As shown in FIGS. 5 and 6, in the slit plate 330, the side plate 330b is bent almost perpendicularly to the bottom plate 330a. The slit plate 330 is positioned on the bottom plate 311a by the positioning projection 311d and is fixed to the scanner frame 202 together with the LD supporting section 310 by a screw 380. The LD supporting section 310 is also fixed to the scanner frame 202 by the screw 380 inserted into the screw hole 313d in the bottom plate 313b of the adjusting section 313. The bottom plates 311a and 313b are formed with notches (not shown) for positioning when the LD supporting section 310 is fixed to the scanner frame 202. The slit plate 330 as a slit member can regulate and unify a spread of beams of light emitted from the optical member held by the optical member holding device.

Attachment and adjustment of the laser unit 300 will be described with reference to FIGS. 5 and 6. The laser unit 300 is bent in the manner of valley fold along broken lines and in the manner of mountain fold along one dotted chain lines as shown in FIG. 4. Thereafter, the LD 350 is force-fitted into the supporting hole 312b of the LD supporting section 310 so that a laser beam is irradiated toward the slit plate 330. The LD supporting section 310 is fixed by the screw 380 to the scanner frame 202 together with the slit plate 330. The screw 370 is inserted from the adjusting hole 312d of the holding section 312 to engage with the screw hole 313c for temporary fixing.

The collimator lens 360 is fitted into the supporting hole 320a of the lens holder 320 and is supported therein. The lens holder 320 supports the collimator lens 360 so that the optical axis of the collimator lens 360 is at right angles to the surface of the lens holder 320.

The lens holder 320 is held by the holding tool (not shown) at the holding hole 320b. The lens holder 320 is positioned onto the fixing section 311 so that the surface of the lens holder 320 is directed in parallel with a direction along which the side plates 311b and 311c face to each other, i.e., so that the optical axis of the collimator lens 360 is directed substantially in parallel to the Z-axis direction. At this time, the collimator lens 360 is supported by the lens holder 320 and is fixed between the supporting walls 311b, 311c. This facilitates lens handling and the lens position adjustment when the lens is fixed. Prior to this positioning process for the lens holder 320, an adhesive is applied to positions on the side plates 311b and 311c of the fixing section 311, the positions corresponding to vertical end faces of the lens holder 320. This adhesive is made from a known UV adhesive that cures upon irradiation of UV light. Since the adhesive cures upon irradiation of the light, curing of the adhesive during position adjustment of the lens holder can be avoided. Unlike an adhesive that cures with the elapse of time, it is possible to eliminate time limitations on the position adjustment of the lens holder 320. Thus, the adhesive can be applied prior to the position adjustment, making it possible to improve productivity and to reduce production costs.

For better assembly, in a production process of the scanner unit 200, it is recommended to apply the UV adhesive as thick as 1 to 2 mm on a vertical surface of the side plates 311b, 311c before positioning the lens holder 320 to a specified position. The UV adhesive needs to be so viscous as to prevent the adhesive from drooping in case of the above-described applied thickness of the adhesive. To this effect, the UV adhesive preferably has a thixotropic ratio ranging from 1.9 to 10. The thixotropic ratio is an index showing anti-drooping nature. If the thixotropic ratio is 1.9 or more, drooping does not occur in the UV adhesive having thickness of 2 mm. Further, it has been known that the UV adhesive keeps its coated configuration within a specified time (e.g., approximately 20 minutes) during which the applied adhesive may be left as it is and during which the position adjustment of the lens holder 320 is performed. If the thixotropic ratio is 10 or less, the UV adhesive is easily deformed to conform with the shape of the vertical end faces of the lens holder 320 when the lens holder 320 is inserted between the positions where the UV adhesive is applied. During the position adjustment of the lens holder 320, the UV adhesive freely deforms and therefore, the UV adhesive does generate resistive force against the movement of the holding tool. This makes it easy to perform highly accurate position adjustment of the lens holder 320 as intended. After the UV adhesive cures, a sufficient adhesive force can be provided among the lens holder 320, the side plates 311b and 311c in X-axis, Y-axis, and Z-axis directions.

That is, by setting thixotropic ratio of the adhesive in the range between 1.9 and 10, drooping of the adhesive hardly occurs even if such adhesive is previously applied to the fixing section 311 as the first supporting member during the process of fixing the lens holder 320 as a lens unit to the fixing section 311 as the first supporting member. This facilitates the position adjustment of the lens unit. The already position adjusted lens holder 320 as the lens unit is fixed with the adhesive to the side plates 311b and 311c as supporting walls. For this reason, the positional relationship between the lens holder 320 and the side plates 311b, 311c can be stably fixed without applying an external force to the side plates 311b, 311c or to the lens holder 320 during fixing. Thus, the position of the lens holder 320 can be maintained after curing the adhesive. Consequently, adjustment of a distance between the light source 350 and the lens unit 320 along the optical axis can be performed easily by adjusting the position of the lens unit 320 inserted between the supporting walls 311b and 311c.

Then, the optical axis of the LD 350 is aligned to that of the collimator lens 360. This process is performed before the polygon mirror 220 is fixed to the scanner frame 202. During the process of optical axis alignment, the LD 350 is supplied with a specified voltage via the circuit substrate 204 (see FIG. 2) and irradiates a laser beam. The laser beam passes through the collimator lens 360 and the slit hole 330e. Since the polygon mirror 220 has not yet been provided on the optical path, the laser beam passes through the inspection hole 202c (FIG. 2) of the scanner frame 202, and then enters a measuring instrument (not shown) installed outside of the scanner frame 202. The measuring instrument is adapted for measuring adjustment degree of the optical axis defined by the LD 350 and the collimator lens 360. Based on this measurement result, the holding tool (not shown) is used to move the lens holder 320 to the X-axis and Y-axis directions for the optical axis adjustment. Though the lens holder 320 contacts with the uncured UV adhesive, the UV adhesive applies a small resistive force against the holding tool and therefore, the UV adhesive does positively interrupt the adjusting movement of the lens holder 320. The UV adhesive does not prevent the holding tool from adjusting the position of the lens holder 320. Consequently, adjustment of the position of the lens holder 320 within a tolerance of 10 μm can be made, for example, within several microns from a targeted adjustment position. As described above, the length B of the short side of the lens holder 320 is 100 μm or more shorter than the length A of the short side of the bottom plate 311a. The lens holder 320 is capable of position adjustment in the X-axis direction. Further, this length difference allows the adhesive to be interposed between the end faces of the lens holder 320 and the support walls 311b, 311c. During the work of alignment of the optical axis, the lens holder 320 is disposed so that a distance between the LD 350 and the collimator lens 360 along the optical axis direction can be within a specified range capable of performing adjustment of the distance by moving the holding section 312 toward and away from the adjusting section 313 to described later.

After completion of the optical axis adjustment for the LD 350 and the collimator lens 360 within the tolerance of several microns as mentioned above, the UV light is irradiated to the UV adhesive for curing. Since the laser unit 300 is made of light-brilliant aluminum, the irradiated UV light is reflected on each surface of the laser unit 300. This increases the amount of UV light to be applied to the UV adhesive and accelerates the curing speed of the UV adhesive. According to the embodiment, the UV adhesive fully cures approximately in ten seconds. In this manner, the lens holder 320 is fixed to the fixing section 311 of the LD support section 310.

The UV adhesive is mixed with glass beads serving as an anti-shrinking agent. Instead of the glass beads, glass powders and mica are available. The anti-shrinking agent reduces a volumetric reduction rate of the UV adhesive upon curing. Consequently, misalignment between the LD 350 and the collimator lens 360 after the optical axis adjustment can be eliminated or minimized for keeping a minute displacement within the tolerable range.

The circuit substrate 204 is formed with the adjustment hole 205 (FIG. 2) and the scanner frame 202 is formed with the through-hole 202d (FIG. 3) coaxial with the adjustment hole 205. After the distance adjustment, a screwdriver or the like is inserted through the adjustment hole 205 and the through-hole 202d to rotate the screw 370 (FIG. 5). This enables the relative position adjustment of the LD 350 and the collimator lens 360 along the optical axis direction based on the principle of leverage. That is to say, in the holding section 312, the connecting portion 314 with the side plate 311b is assumed to be a fulcrum, the position of the adjusting hole 312d to be a power point, and the position of the supporting hole 312b for the LD 350 to be an acting point. The ratio of a moving stroke of the power point to a moving stroke of the acting point is proportional to the ratio of distance from the fulcrum to the power point to a distance from the fulcrum to the acting point. If the power point is set to be farther than the acting point from the fulcrum, largely moving the power point can decrease the movement at the acting point. When the screw 370 is rotated to adjust a distance between the extension end 312a of the holding section 312 and the side plate 313a, it is possible to perform fine adjustment of the distance between the LD 350 and the collimator lens 360 that need to be finally adjusted to sufficiently satisfy the adjustment level with a tolerance of 1 μm or less. Tightening the screw 370 moves the LD 350 toward the +Z direction. Loosening the screw 370 moves the LD 350 toward the −Z direction. This is because the aluminum plate 312 resiliently restores its original position in a direction to increase the distance between the extension end 312a of the holding section 312 and the side plate 313a that are both configured not to contact with each other. Further, the adjusting hole 312d has an elliptical shape whose major axis extending along the X-axis direction, a large vertical movement (Y-axis direction) of the holding section 312 can be regulated by the engagement of the screw 370 with the elliptical hole 312d. Misalignment, if occurred, can be restrained within the tolerable range.

After completion of the relative position adjustment for the LD 350 and the collimator lens 360 in the laser unit 300, the polygon mirror 220 is assembled to the scanner frame 202. The scanner frame 202 is fixed to the tray 203 and is approximately sealed by the top cover member 201. The scanner frame 202 is then fixed between the right and left body frames (not shown) of the laser printer 1. The LD supporting section 310 and the lens holder 320 of the laser unit 300 are made of the same material, and therefore, is subject to the same linear expansion coefficient. Even if the temperature changes of an ambient environment such as heat generation from the LD 350, the LD supporting section 310 and the lens holder 320 expand at the same rate. This makes it possible to stably maintain the adjusted position.

That is to say, the lens holder 320 is designed so as to align the center of the collimator lens 360 with the center of the lens holder 320. Even if the lens holder 320 fixed between the two supporting walls thermally expands, thermal expansion amount of the lens holder 320 from the center of the lens holder 320 toward one supporting wall is equal to that toward the other supporting wall. Therefore, the position of the collimator lens 360 can be stably maintained.

Operation of the laser printer 1 will be described with reference to FIGS. 1 and 2. A stack of paper is placed on the paper pressing plate 7 of the paper cassette 6. An uppermost paper 3 of paper stack is urged from the rear of the paper pressing plate 7 toward the sheet supply roller 8 by the biasing force of the coil spring 7b. A print operation starts upon reception of print data from a host computer (not shown). At this time, the paper 3 is fed by a frictional force applied from the sheet supply roller 8 and is nipped between the sheet supply roller 8 and the separation pad 9. After separated from the stack of paper, the paper 3 is transported to the registration roller 12.

In the scanner unit 200, the LD 350 of the laser unit 300 irradiates laser beams based on a laser drive signal generated from the engine circuit board 85. The collimator lens 360 in FIG. 5 collimates the laser beams into almost parallel rays. Thereafter, the slit hole 330e regulates a spread of laser beams. The cylindrical lens 210 vertically refracts the laser beams to be focused on the polygon mirror 220. The polygon mirror 220 horizontally scans the laser beam when reflecting the laser beam and allows the laser beam to be incident on the fθ lens 230. The laser beam scanned at a constant angular velocity by the polygon mirror 220 is converted into constant speed scanning by the fθ lens 230. After the laser beam is reflected on the mirrors 240 and 250, the cylindrical lens 260 corrects vertical surface misalignment due to the polygon mirror 220. The laser beam is focused on the surface of the photosensitive drum 27 via the mirror 270.

A surface potential of the photosensitive drum 27 becomes approximately 1000V by the scorotron charger 29. Then, the photosensitive drum 27 is exposed to the laser beam during rotation in the arrow direction (clockwise in the drawing). On a main scanning line on the photosensitive drum 27, the laser beam is irradiated to a portion to be developed and is not irradiated to a portion not to be developed. The irradiated portion (bright portion) decreases its surface potential down to approximately 200V. Since the photosensitive drum 27 rotates, the laser beam is also irradiated in an auxiliary scanning direction (the direction of transporting the paper 3). Thus, the dark portion and the bright portion form an electrical invisible image, i.e., an electrostatic latent image on the surface of the photosensitive drum 27.

The agitator 36 rotates to supply a toner in the toner hopper 34 to the toner supply roller 33. The toner supply roller 33 rotates to supply the toner to the developing roller 31. At this time, the toner is positively frictionally-charged between the toner supply roller 33 and the developing roller 31. The toner is further adjusted to be a thin layer of a specified thickness and is mounted on the developing roller 31. The developing roller 31 is applied with a positive bias of substantially 400 V. As mentioned above, the toner is mounted on the developing roller 31 and is positively charged. When the developing roller 31 rotates to allow the toner to contact with the opposite photosensitive drum 27, the toner is transferred to the electrostatic latent image formed on the surface of the photosensitive drum 27. The potential of the developing roller 31 is lower than the dark portion's potential (+1000 V) and is higher than the bright portion's potential (+200 V). Consequently, the toner is selectively transferred to low-potential bright portions. In this manner, a visible toner image is formed and developed as a developer image on the surface of the photosensitive drum 27.

The registration roller 12 performs sheet registration. That is, the registration roller 12 releases the paper 3 when the leading edge of the paper 3 reaches the leading edge of the visible image formed on the surface of the rotating photosensitive drum 27. When the paper 3 passes between the photosensitive drum 27 and a transfer roller 30, the transfer roller 30 is applied with a negative constant voltage so that the potential of the transfer roller 30 becomes much lower (e.g., −1000 V) than the bright portion's potential (+200 V). In this manner, the visible image formed on the surface of the photosensitive drum 27 is transferred to the paper 3.

The paper 3 carrying the toner image is transported to the fixing unit 18. In the fixing unit 18 the heat roller 41 applies a heat of approximately 200° C. to the toner-carrying paper 3 and the press roller 42 applies pressure to the paper 3. The toner is welded on the paper 3 to form a permanent image. The heat roller 41 and the pressure roller 42 are grounded via diodes. It is configured that a surface potential of the pressure roller 42 becomes lower than that of the heat roller 41. Therefore, the positively charged toner mounted on one side of the paper 3, the one side being in confrontation with the heat roller 41, can be electrically absorbed to the pressure roller 42 through the paper 3. This prevents the image from being degraded due to unwanted transfer of the toner to the heat roller 41 during fixing operation.

After the toner is pressed, heated, and fixed to the paper 3, the paper 3 is ejected from the fixing unit 18 by the transport roller 43. The paper 3 is transported along the paper ejection path 44 and is ejected with its printed side down to the discharge tray 46 by the discharge roller 45. The subsequent paper 3 to be printed next is likewise stacked with its printed side down on the previously ejected paper 3 in the discharge tray 46. In this manner, a user can obtain printed papers 3 that are stacked in the order of printing.

As mentioned above, in the laser unit 300 as the optical member holding device according to the present invention, the LD 350 is supported by the LD supporting section 310 made of single light brilliant aluminum plate. The holding tool is used to hold the lens holder 320 supporting the collimator lens 360. The lens holder 320 is inserted between the side plates 311b and 311c that are previously applied with the UV adhesive and constitute the first supporting member of the LD support section 310. Before the lens holder 320 is fixed, optical axis is adjusted between the LD 350 and the collimator lens 360 in the X and Y directions. With the adjusted position maintained, the UV light is irradiated to fix the lens holder 320. With the collimator lens 360 fixed, a distance control between the LD 350 and the collimator lens 360 in the optical axis direction can be performed by finely moving the LD 350 with respect to the collimator lens 360 in the optical axis direction based on the principle of leverage. That is, the connecting portion 314 is assumed to be a fulcrum, the position of the adjusting hole 312d to be a power point, and the position of the supporting hole 312b for the LD 350 to be the acting point in the holding section 312. In this case, the power point and the acting point can be positioned to the same side with reference to the fulcrum, and the distance between the fulcrum and the power point is greater than the distance between the fulcrum and the acting point. Therefore, the moving stroke of the acting point can be reduced to enable fine distance control. Because adjusting a distance between the LD 350 as the light source and the lens holder 320 as the lens unit in the optical axis direction can be easily performed, accuracy of convergence of light flux irradiated from the light source can be improved. Furthermore, the light source having a wide tolerable range of optical axis misalignment is fixed to the movable side, i.e., the holding section 312 as the second supporting member which is movable by the adjustment means, whereas the lens unit having the tolerable range smaller than that of the light source is fixed to the stationary side, i.e., the fixing section 311 as the first supporting member. Consequently, the distance control between the light source and the lens unit in the optical axis direction can be performed easily.

The holding section 312 as the second supporting member is out of surface contact from the side plate 313a as the adjusting member, distortion does not occur at the time of screw fixing operation with the screw 370. Consequently, no optical axis misalignment occurs due to the distortion, making it possible to stably maintain the adjusted position. Further, the first and second supporting members 311, 312 and the adjusting section 313 can be made of a single material, saving manufacturing costs.

The LD supporting section 310 and the lens holder 320 are made of the same material and show the same linear expansion coefficient. Further, the collimator lens 360 is positioned at the longitudinal center of the lens holder 320. Therefore, even if the laser unit 300 thermally expands due to heat generation from the LD 350, for example, no expansion difference occurs between these components. Thus, the adjusted optical axis direction can be maintained in a stable manner.

The LD supporting section 310 and the lens holder 320 are made of aluminum. Further, the scanner frame 202 made of resin mixed with reinforcing agent has the linear expansion coefficient almost the same as that of the LD supporting section 310 and the lens holder 320. Therefore, a heat expansion causes no expansion difference between these components, making it possible to stably maintain the adjusted optical axis direction. The Incidentally, LD supporting section 310 and the lens holder 320 made of aluminum show a linear expansion coefficient of $2.3 \times 10^{-5}$/K. Resins such as PC (polycarbonate) and modified PPE (a resin made by modifying polyphenylene ether with polystyrene) show a linear expansion coefficient of from $6 \times 10^{-5}$/K to $8 \times 10^{-5}$/K. The scanner frame 202 formed by mixing any of these resins with reinforcements such as glass fiber and the like exhibits a linear expansion coefficient of $1.8 \times 10^{-5}$/K to $3.5 \times 10^{-5}$/K.

Figure 7:
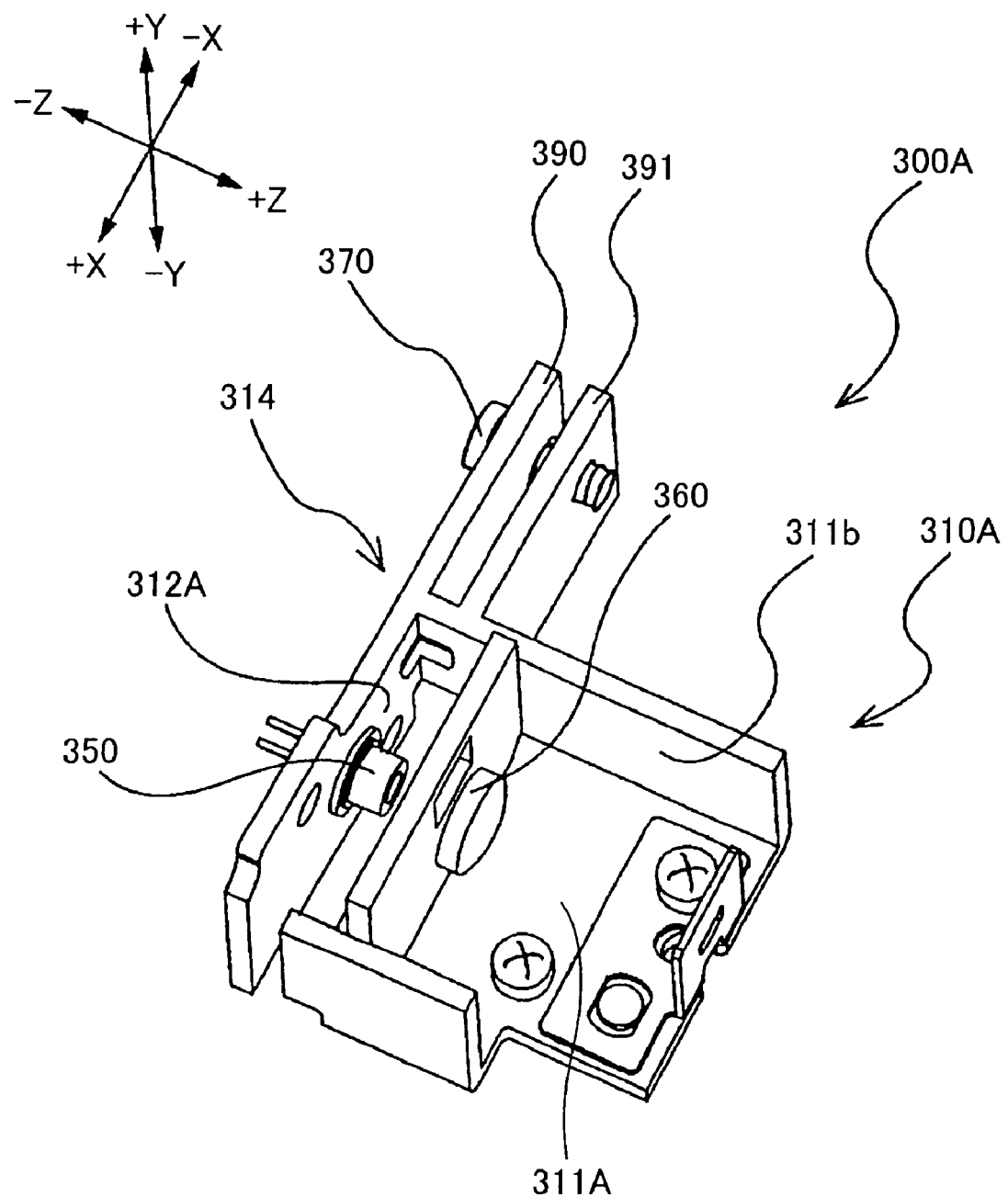
FIG. 7 shows a modification to the laser unit.

FIG. 7 shows one modification to a laser unit. The laser unit 300A includes a support portion 310A. A power point of a holding section 312A is positioned opposite to an acting point with respect to the fulcrum. That is to say, the fulcrum is represented by the connecting portion 314 between the side plate 311b of the fixing section 311A and the holding section 312A. A side plate 390 extends from the connecting portion 314 in a direction opposite to the holding section 312A in linear relation thereto. Another side plate 391 extends from the side plate 311b in a direction opposite to the holding section 312A and in parallel to the side plat 390.

The power point is positioned near free ends of the side plates 390 and 391. When the screw 370 is used to make both side plates close to or distant from each other, the holding section 312A in flush with the side plate 390 moves accordingly about the connecting portion 314 functioning as the fulcrum. Thus, the LD 350 as the acting point can be moved away from or close to the collimator lens 360.

Figure 8:
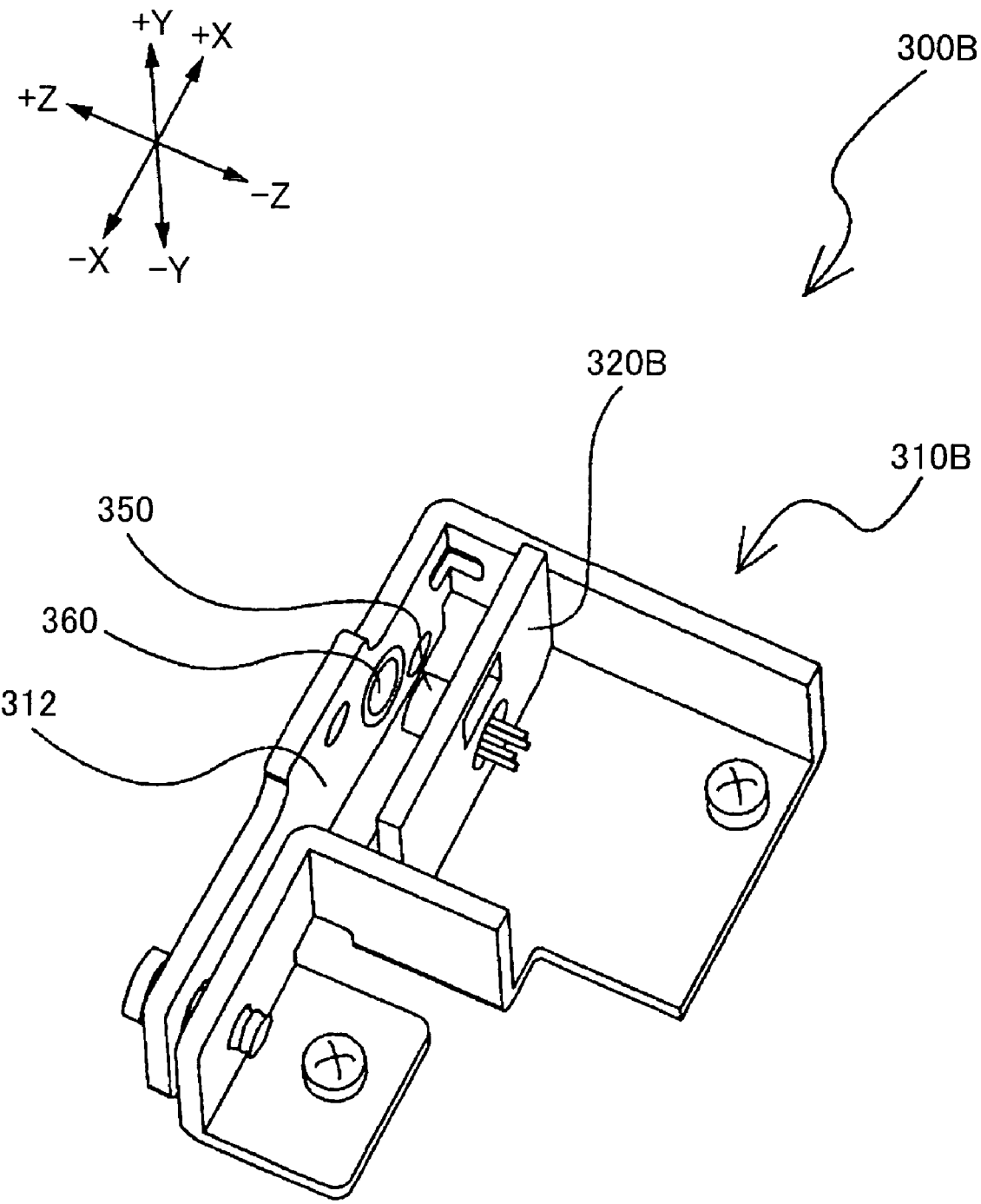
FIG. 8 shows another modification to the laser unit.

FIG. 8 shows another modification to a laser unit. The laser unit 300B includes a support portion 310B. The slit plate 330 provided in the foregoing embodiment is not provided in the laser unit 300B. The LD 350 is supported by a lens holder 320B. A holding section 312B of the LD support section 310B supports the collimator lens 360. In this case, adjustment of the optical axis between the LD 350 and the collimator lens 360 and adjustment of a distance therebetween in the optical axis direction can be performed in the same manner as the foregoing embodiment. The laser beam is irradiated in the +Z direction.

While the invention has been described in detail and with reference to the specific embodiment thereof, it would be apparent to those skilled in the art that various changes and modifications may be made therein without departing from the scope of the invention. For example, the same size of the side plate 311c is preferably the same as the size of the side plate 311b in the fixing section 311 of the LD supporting section 310 as long as the side plates 311c and 311b extend in parallel to each other. Further, a slit can be formed in the lens holder 320 without providing the slit plate 330. Further, a circular adjusting hole of the holding section 312 can be formed instead of the elliptical or oblong hole 312d. Further, the collimator lens 360 can be directly bonded to the side plates 311b and 311c without using the lens holder 320.

Further, the collimator lens 360 can be fixedly assembled in a cylindrical lens barrel made of a molded resin mixed with compound having a high thermal conductivity so as to provide almost the same linear expansion coefficient as that of aluminum. The collimator lens 360 can be fixed in the lens barrel to prevent the lens from being touched inadvertently and make the lens handling easy during manufacturing processes. In this case, the lens barrel and the lens holder 320 have almost the same linear expansion coefficient. Therefore, even if the lens holder 320 supporting the lens barrel is affected by heat generation from the LD 350, for example, a portion of the lens barrel surrounding the collimator lens 360 almost evenly expands thermally. Thus, the center of the lens 360 is less susceptible to misalignment. The lens barrel fixedly provided with the collimator lens 360 is equivalent to the lens unit in the present invention. Further, a slit can be formed in the lens barrel. This means that the slit is directly provided in the lens holder or the lens unit, which in turn decreases minute positional displacement during assembly, thereby enhancing dimensional accuracy of the resultant product.

Further, screws can be used for fixing the lens holder 320 to the LD supporting section 310. Further, instead of the brilliant treatment to the surface of the laser unit 300, glossy treatment can be performed thereto. Further, an aluminum plate or other metal plate not subjected to brilliant nor glossy treatment can be used as a material of the laser unit if UV light capable of providing a higher light intensity is available in the manufacturing process.

Further, the LD supporting section 310 and the lens holder 320 can be formed of a resin, a mixture of a metal and resin, or other materials. In these cases, it is desirable to use a material having a thermal conductivity of 0.9 W/(m·K) or more especially for the holding section 312, the fixing section 311, and the lens holder 320 those constituting the laser unit 300. Generally, thermal conductivity of metal is higher than that of a resin. If some parts are molded resin products, the resin material having the thermal conductivity as approximate to that of metal should be selected. This can decrease distortions between parts due to difference in linear expansion coefficients. Generally the resin provides a thermal conductivity ranging from 0.2 to 0.3 W/(m·K). However, Hitachi Ltd. has developed a specific epoxy resin having the thermal conductivity of 0.96 W/(m·K). The use of such resin can effectively dissipate heat generated from the LD 350 to permit the LD 350 to be operated with excellent thermal stability, thereby decreasing irregular light emission from the LD 350.

Further, with the scanner unit 200 as the optical scanning device, adjustment of a light flux irradiated to the rotating polygonal mirror can be facilitated during assembly, making it possible to decrease manufacturing costs. Further, since the fixing section 311 is fixed to the inside wall of the scanner frame 202, fixing the fixing section 311 is completed upon fixing the scanner frame 202. This can facilitate adjustment of light flux irradiated from the optical member holding device and decrease manufacturing costs.

Further, if the scanner frame 202 is made of a resin mixed with reinforcement agent, manufacturing cost can be reduced while keeping the rigidity of the frame at high level. Moreover, since the laser printer 1 has the above-mentioned optical scanning device, the printer 1 can be produced with a reduced numbers of production process and at a low manufacturing cost.

What is claimed is:

1. An image forming device comprising:
an optical scanning device comprising
a frame;
an optical member holding device disposed in the frame and comprising:
a first supporting section supporting a first optical member;
a second supporting section supporting a second optical member positioned opposite to the first optical member;
a connecting portion connecting the first supporting section to the second supporting section; and
an adjustment section for adjusting a relative position between the first optical member and the second optical member, the adjustment section allowing the second supporting section to be movable and position fixable with respect to the first supporting section as if the second supporting section serves as a lever that bends about the connecting portion that functions as a fulcrum;
a rotatable polygonal mirror disposed in the frame and changing reflecting direction of a light flux emitted from the optical member holding device for scanning;
a drive unit disposed in the frame and rotating the polygonal mirror; and
an image focusing unit disposed in the frame for focusing the scanned light flux onto an imaging medium for providing an electrostatic latent image thereon;
a developing unit that forms a visible developed image corresponding to the electrostatic latent image on the imaging medium;
a transfer unit that transfer the visible developed image from the imaging medium to an image recording medium; and
a fixing unit that fixes the visible developed image on the image recording medium.

2. The image forming device as claimed in claim 1,
wherein the first supporting section and the second supporting section are provided integrally with each other.

3. The image forming device as claimed in claim 1,
wherein the second supporting section has one end at which the connecting portion is provided.

4. The image forming device as claimed in claim 3,
wherein the second supporting section defines a power point movable toward the adjustment section by a first angular moving distance about the connecting portion as the fulcrum, and wherein the second optical member defines an acting point movable toward the first optical member by a second angular moving distance about the connecting portion, the first angular moving distance being greater than the second angular moving distance.

5. The image forming device as claimed in claim 4,
wherein the fulcrum and the power point provides a first distance therebetween and the fulcrum and the acting point provides a second distance therebetween smaller than the first distance.

6. The image forming device as claimed in claim 1,
wherein the first optical member comprises,
one of a light source emitting a light flux and defining an optical axis,
and a lens unit converging the light flux,
and wherein the second optical member comprises,
a remaining one of the light source and the lens unit, the adjustment section adjusting a distance between the light source
and the lens unit along the optical axis.

7. The image forming device as claimed in claim 6,
wherein the first supporting section supports the lens unit, and the second supporting section supports the light source.

8. The image forming device as claimed in claim 6,
wherein at least one of the first supporting section and the second supporting section supporting the light source is made from a material providing a thermal conductivity not less than 0.9 W/(m·K).

9. The image forming device as claimed in claim 6,
wherein at least one of the first supporting section and the second supporting section supporting the light source is made from a metal.

10. The image forming device as claimed in claim 6,
wherein at least one of the first supporting section and the second supporting section supporting the lens unit is made from a metal.

11. The image forming device as claimed in claim 6,
wherein the first supporting section comprises
a first supporting wall
and a second supporting wall extending in parallel to each other in a direction of the optical axis,
one of the light source and the lens unit being adjustably disposed between the first supporting wall and the second supporting wall.

12. The image forming device as claimed in claim 11,
wherein the first supporting wall has one end portion connected to the connecting portion,
and the second supporting wall is provided with an opposing section positioned in confrontation with the second supporting section with a space therebetween,
the adjustment section adjustably and angularly moving the second supporting section about the connecting portion toward and away from the opposing section for controlling the distance between the light source and the lens unit along the optical axis.

13. The image forming device as claimed in claim 11,
wherein the first supporting section is provided with a slit section for regulating the light flux having been irradiated from the light source and having been passed through the lens unit when the light flux passes through the slit section.

14. The image forming device as claimed in claim 11,
wherein one of the light source and the lens unit is fixed to the inbetween the first supporting wall and the second supporting wall with an adhesive.

15. The image forming device as claimed in claim 14,
wherein at least 100 μm of a gap is provided between one of the light source and the lens unit and first and second supporting walls in a direction orthogonal to extending direction of the first and second supporting walls.

16. The image forming device as claimed in claim 14,
wherein the adhesive is a photo-curable adhesive.

17. The image forming device as claimed in claim 14,
wherein the adhesive contains an anti-shrinking agent.

18. The image forming device as claimed in claim 14, wherein the adhesive provides a thixotropic ratio ranging from 1.9 to 10.

19. The image forming device as claimed in claim 11, wherein the first supporting section supports the lens unit comprising
a lens and
a lens holder supporting the lens,
the first supporting wall and the second supporting wall fixing the lens holder inbetween with an adhesive.

20. The image forming device as claimed in 19, wherein the lens holder is made of a material whose linear expansion coefficient is substantially the same as that of the first supporting section.

21. The image forming device as claimed in claim 19, wherein the lens holder has one end to be fixed to the first supporting wall and another end to be fixed to the second supporting wall,
and wherein the lens has a lens center,
a distance between the lens center and the one end of the lens holder being substantially equal to a distance between the lens center and the another end of the lens holder.

22. The image forming device as claimed in claim 19, wherein the lens holder is provided with a slit member to regulate the light flux which has been irradiated from the light source.

23. The image forming device as claimed in claim 1, wherein the first supporting section of the optical member holding device is fixed to the frame.

24. The image forming device as claimed in claim 1, wherein the frame is made from a resin mixed with a reinforcing agent.

25. An optical scanning device comprising:
a frame;
an optical member holding device disposed in the frame and comprising;
    a first supporting section supporting a first optical member;
    a second supporting section supporting a second optical member positioned opposite to the first optical member;
    a connecting portion connecting the first supporting section to the second supporting section; and
    an adjustment section for adjusting a relative position between the first optical member and the second optical member, the adjustment section allowing the second supporting section to be movable and position fixable with respect to the first supporting section as if the second supporting section serves as a lever that bends about the connecting portion that functions as a fulcrum;
a rotatable polygonal mirror disposed in the frame and changing reflecting direction of a light flux emitted from the optical member holding device for scanning;
a drive unit disposed, in the frame and rotating the polygonal mirror; and
an image focusing unit disposed in the frame for focusing the scanned light flux onto an imaging medium.

26. The optical scanning device as claimed in 25, wherein the first supporting section of the optical member holding device is fixed to the frame.

27. The optical scanning device as claimed in claim 25, wherein the frame is made from a resin mixed with a reinforcing agent.

28. An image forming device comprising:
an optical scanning device comprising
a frame;
an optical member holding device disposed in the frame and comprising:
    a first supporting section supporting a first optical member;
    a second supporting section supporting a second optical member positioned opposite to the first optical member, an optical axis being defined between the first optical member and the second optical member;
    a connecting portion connecting the first supporting section to the second supporting section; and
    an adjustment section for adjusting a relative position between the first optical member and the second optical member, the adjustment section allowing the second supporting section to be movable and position fixable with respect to the first supporting section as if the second supporting section serves as a leverage about the connecting portion functioning as a fulcrum, the connecting portion being offset from the optical axis;
a rotatable polygonal mirror disposed in the frame and changing reflecting direction of a light flux emitted from the optical member holding device for scanning;
a drive unit disposed in the frame and rotating the polygonal mirror; and
an image focusing unit disposed in the frame for focusing the scanned light flux onto an imaging medium for providing an electrostatic latent image thereon;
a developing unit that forms a visible developed image corresponding to the electrostatic latent image on the imaging medium;
a transfer unit that transfer the visible developed image from the imaging medium to an image recording medium; and
a fixing unit that fixes the visible developed image on the image recording medium,
wherein the first optical member comprises:
    one of a light source emitting a light flux and defining an optical axis, and
    a lens unit converging the light flux, and
wherein the second optical member comprises a remaining one of the light source and the lens unit, the adjustment section adjusting a distance between the light source and the lens unit along the optical axis.

29. The image forming device as claimed in claim 28, wherein the first supporting section and the second supporting section are provided integrally with each other.

30. The image forming device as claimed in claim 28, wherein the second supporting section has one end at which the connecting portion is provided.

31. The image forming device as claimed in claim 30, wherein the second supporting section defines a power point movable toward the adjustment section by a first angular moving distance about the connecting portion as the fulcrum, and wherein the second optical member defines an acting point movable toward the first optical member by a second angular moving distance about the connecting portion, the first angular moving distance being greater than the second angular moving distance.

32. The image forming device as claimed in claim 31, wherein the fulcrum and the power point provides a first distance therebetween and the fulcrum and the acting point provides a second distance therebetween smaller than the first distance.

33. The image forming device as claimed in claim 28, wherein the first supporting section supports the lens unit, and the second supporting section supports the light source.

34. The image forming device as claimed in claim 28, wherein at least one of the first supporting section and the second supporting section supporting the light source is made from a material providing a thermal conductivity not less than 0.9 W/(m·K).

35. The image forming device as claimed in claim 28, wherein at least one of the first supporting section and the second supporting section supporting the light source is made from a metal.

36. The image forming device as claimed in claim 28, wherein at least one of the first supporting section and the second supporting section supporting the lens unit is made from a metal.

37. The image forming device as claimed in claim 28, wherein the first supporting section comprises
a first supporting wall
and a second supporting wall extending in parallel to each other in a direction of the optical axis,
one of the light source and the lens unit being adjustably disposed between the first supporting wall and the second supporting wall.

38. The image forming device as claimed in claim 37, wherein the first supporting wall has one end portion connected to the connecting portion,
and the second supporting wall is provided with an opposing section positioned in confrontation with the second supporting section with a space therebetween,
the adjustment section adjustably and angularly moving the second supporting section about the connecting portion toward and away from the opposing section for controlling the distance between the light source and the lens unit along the optical axis.

39. The image forming device as claimed in claim 37, wherein the first supporting section is provided with a slit section for regulating the light flux having been irradiated from the light source and having been passed through the lens unit when the light flux passes through the slit section.

40. The image forming device as claimed in claim 37, wherein one of the light source and the lens unit is fixed to the inbetween the first supporting wall and the second supporting wall with an adhesive.

41. The image forming device as claimed in claim 40, wherein at least 100 μm of a gap is provided between one of the light source and the lens unit and first and second supporting walls in a direction orthogonal to extending direction of the first and second supporting walls.

42. The image forming device as claimed in claim 40, wherein the adhesive is a photo-curable adhesive.

43. The image forming device as claimed in claim 40, wherein the adhesive contains an anti-shrinking agent.

44. The image forming device as claimed in claim 40, wherein the adhesive provides a thixotropic ratio ranging from 1.9 to 10.

45. The image forming device as claimed in claim 37, wherein the first supporting section supports the lens unit comprising
a lens and
a lens holder supporting the lens,
the first supporting wall and the second supporting wall fixing the lens holder inbetween with an adhesive.

46. The image forming device as claimed in 45, wherein the lens holder is made of a material whose linear expansion coefficient is substantially the same as that of the first supporting section.

47. The image forming device as claimed in claim 45, wherein the lens holder h as one end to be fixed to the first supporting wall and another end to be fixed to the second suppoeting wall,
and wherein the lens has a lens center,
a distance between the lens center and the one end of the lens holder being substantially equal to a distance between the lens center and the another end of the lens holder.

48. The image forming device as claimed in claim 45, wherein the lens holder is provided with a slit member to regulate the light flux which has been irradiated from the light source.

49. The image forming device as claimed in claim 28, wherein the first supporting section of the optical member holding device is fixed to the frame.

50. The image forming device as claimed in claim 28, wherein the frame is made from a resin mixed with a reinforcing agent.

51. An optical scanning device comprising:
a frame;
an optical member holding device disposed in the frame and comprising;
a first supporting section supporting a first optical member;
a second supporting section supporting a second optical member positioned opposite to the first optical member, an optical axis being defined between the first optical member and the second optical member;
a connecting portion connecting the first supporting section to the second supporting section; and
an adjustment section for adjusting a relative position between the first optical member and the second optical member, the adjustment section allowing the second supporting section to be movable and position fixable with respect to the first supporting section as if the second supporting section serves as a lever that bends about the connecting portion that functions as a fulcrum, the connecting portion being offset from the optical axis;
a rotatable polygonal mirror disposed in the frame and changing reflecting direction of a light flux emitted from the optical member holding device for scanning;
a drive unit disposed in the frame and rotating the polygonal mirror; and
an image focusing unit disposed in the frame for focusing the scanned light flux onto an imaging medium.

52. The optical scanning device as claimed in 51, wherein the first supporting section of the optical member holding device is fixed to the frame.

53. The optical scanning device as claimed in claim 51, wherein the frame is made from a resin mixed with a reinforcing agent.

54. An image forming device comprising:
an optical scanning device comprising
a frame;
an optical member holding device disposed in the frame and comprising:
a first supporting section supporting a first optical member;
a second supporting section supporting a second optical member positioned opposite to the first optical member;
a connecting portion connecting the first supporting section to the second supporting section, wherein the second supporting section has one end at which the connecting portion is provided; and an adjustment section for adjusting a relative position between the first optical member and the second optical member, the adjustment section allowing the second supporting section to be movable and position fixable with respect to the first supporting section as if the second supporting section serves as a leverage about the connecting portion functioning as a fulcrum, wherein the second supporting section defines a power point movable toward the adjustment section by a first angular moving distance about the connecting portion as the fulcrum, and wherein the second optical member defines an acting point movable toward the first optical member by a second angular moving distance about the connecting portion, the first angular moving distance being greater than the second angular moving distance;

a rotatable polygonal mirror disposed in the frame and changing reflecting direction of a light flux emitted from the optical member holding device for scanning;

a drive unit disposed in the frame and rotating the polygonal mirror; and an image focusing unit disposed in the frame for focusing the scanned light flux onto an imaging medium for providing an electrostatic latent image thereon;

a developing unit that forms a visible developed image corresponding to the electrostatic latent image on the imaging medium;

a transfer unit that transfer the visible developed image from the imaging medium to an image recording medium; and a fixing unit that fixes the visible developed image on the image recording medium.

55. An image forming device comprising:

an optical scanning device comprising a frame;

an optical member holding device disposed in the frame and comprising:

a first supporting section supporting a first optical member;

a second supporting section supporting a second optical member positioned opposite to the first optical member;

a connecting portion connecting the first supporting section to the second supporting section; and an adjustment section for adjusting a relative position between the first optical member and the second optical member, the adjustment section allowing the second supporting section to be movable and position fixable with respect to the first supporting section as if the second supporting section serves as a leverage about the connecting portion functioning as a fulcrum;

a rotatable polygonal mirror disposed in the frame and changing reflecting direction of a light flux emitted from the optical member holding device for scanning;

a drive unit disposed in the frame and rotating the polygonal mirror; and an image focusing unit disposed in the frame for focusing the scanned light flux onto an imaging medium for providing an electrostatic latent image thereon;

a developing unit that forms a visible developed image corresponding to the electrostatic latent image on the imaging medium;

a transfer unit that transfer the visible developed image from the imaging medium to an image recording medium; and a fixing unit that fixes the visible developed image on the image recording medium, wherein the first optical member comprises,
    one of a light source emitting a light flux and defining an optical axis,
    and a lens unit converging the light flux,
and wherein the second optical member comprises,
    a remaining one of the light source and the lens unit, the adjustment section adjusting a distance between the light source
    and the lens unit along the optical axis.

56. An image forming device comprising:

an optical scanning device comprising a frame;

an optical member holding device disposed in the frame and comprising:

a first supporting section supporting a first optical member;

a second supporting section supporting a second optical member positioned opposite to the first optical member;

a connecting portion connecting the first supporting section to the second supporting section; and an adjustment section for adjusting a relative position between the first optical member and the second optical member, the adjustment section allowing the second supporting section to be movable and position fixable with respect to the first supporting section as if the second supporting section serves as a leverage about the connecting portion functioning as a fulcrum;

a rotatable polygonal mirror disposed in the frame and changing reflecting direction of a light flux emitted from the optical member holding device for scanning;

a drive unit disposed in the frame and rotating the polygonal mirror; and an image focusing unit disposed in the frame for focusing the scanned light flux onto an imaging medium for providing an electrostatic latent image thereon;

a developing unit that forms a visible developed image corresponding to the electrostatic latent image on the imaging medium;

a transfer unit that transfer the visible developed image from the imaging medium to an image recording medium; and a fixing unit that fixes the visible developed image on the image recording medium, wherein at least one of the first supporting section and the second supporting section supporting a light source is made from a material providing a thermal conductivity not less than 0.9 W/(m·K).

* * * * *